(12) United States Patent
Chiu et al.

(10) Patent No.: US 8,525,465 B2
(45) Date of Patent: Sep. 3, 2013

(54) FEEDBACK SWITCHING DEVICE AND METHOD FOR DRIVING OF SERVO MOTOR

(75) Inventors: Kuo-Lin Chiu, Hsinchu (TW);
Chia-Min Ting, Hsinchu (TW);
Hsin-Hung Chou, Hsinchu (TW)

(73) Assignee: Industrial Technology Research Institute, Hsinchu (TW)

(*) Notice: Subject to any disclaimer, the term of this patent is extended or adjusted under 35 U.S.C. 154(b) by 385 days.

(21) Appl. No.: 12/964,297

(22) Filed: Dec. 9, 2010

(65) Prior Publication Data

US 2012/0098476 A1  Apr. 26, 2012

(30) Foreign Application Priority Data

Oct. 25, 2010 (TW) ................ 99136287 A (51) Int. Cl.
*G05B 11/01* (2006.01)
*G05B 1/06* (2006.01)
*H02K 37/00* (2006.01)
*H02P 27/00* (2006.01)

(52) U.S. Cl.
USPC ............ 318/560; 318/437; 318/639; 318/782

(58) Field of Classification Search
USPC .................... 318/437, 560, 639, 782
See application file for complete search history.

(56) References Cited

U.S. PATENT DOCUMENTS

| | | | | |
|---|---|---|---|---|
| 4,528,486 A | * | 7/1985 | Flaig et al. | 318/400.21 |
| 4,713,596 A | * | 12/1987 | Bose | 318/802 |
| 5,038,090 A | * | 8/1991 | Kawabata et al. | 318/721 |
| 5,600,221 A | * | 2/1997 | Tomatsuri et al. | 318/632 |
| 5,912,539 A | | 6/1999 | Sugitani et al. | |
| 6,528,966 B2 | | 3/2003 | Na | |
| 6,856,039 B2 | | 2/2005 | Mikhail et al. | |
| 6,861,897 B1 | | 3/2005 | Cheng et al. | |
| 6,958,589 B2 | | 10/2005 | Kawaji et al. | |
| 7,002,318 B1 | * | 2/2006 | Schulz et al. | 318/782 |
| 7,402,975 B2 | | 7/2008 | Takata et al. | |

(Continued)

FOREIGN PATENT DOCUMENTS

| TW | 200622595 | 7/2006 |
|---|---|---|
| TW | 201025727 | 7/2010 |
| TW | M385167 | 7/2010 |

OTHER PUBLICATIONS

S. Chi et al., A Novel Sliding Mode Observer with Adaptive Feedback Gain for PMSM Sensorless Vector Control, IEEE, 2007, pp. 2579-2585.

(Continued)

*Primary Examiner* — Eduardo Colon Santana
*Assistant Examiner* — Gabriel Agared
(74) *Attorney, Agent, or Firm* — Muncy, Geissler, Olds & Lowe, PLLC (57) ABSTRACT

A feedback switching device and a method allow a drive control loop for a servo motor to actively switch the feedback mode in accordance with the rotating speed of the servo motor. When the servo motor is under a high speed operation, a sensorless position estimation feedback technology is used as the feedback mode; on the other hand, when the servo motor is under a low speed operation, the switching mode is automatically switched to a position sensing feedback technology. Therefore, the development needs for multi-function, high performance and low cost in the field of the servo motor control are met, and the conventional problem is solved that, when being applied to a servo driving system having a wide speed range, the single use of the position sensing feedback technology or the sensorless position estimation feedback technology fails to satisfy the application for a wide speed range.

13 Claims, 5 Drawing Sheets

(56) References Cited

U.S. PATENT DOCUMENTS

| | | |
|---|---|---|
| 7,497,870 B2 | 3/2009 | Frey et al. |
| 7,531,974 B2 | 5/2009 | Ohtsuka et al. |
| 2006/0007615 A1 | 1/2006 | Ochiai et al. |
| 2007/0075656 A1 | 4/2007 | Moller et al. |
| 2008/0079377 A1 | 4/2008 | Williams et al. |
| 2008/0180052 A1 | 7/2008 | Iwashita et al. |

OTHER PUBLICATIONS

Enzo Chiricozzi et al., Sensorless Permanent Magnet Synchronous Motor Drive Solution for Compressor Application, 2010, pp. AQ-1-AQ-16.

Arfeen Mohammed, DSP Controller-based design and implementation for PMSM, Texas Instruments, Apr. 18-28, 2005, 37 pages, TI Developer Conference.

Cristian Lascu et al., Combining the Principles of Sliding Mode, Direct Torque Control, and Space Vector Modulation in a High-Performance Sensorless AC Drive, IEEE, 2002, pp. 2073-2078.

Masaru Hasegawa et al., Position Sensorless Control of Interior Permanent Magnet Synchronous Motors Using Unknown Input Observer for High-Speed Drives, IEEE, 2009, pp. 938-946, vol. 45, No. 3, Transactions on Industry Applications.

* cited by examiner

FEEDBACK SWITCHING DEVICE AND METHOD FOR DRIVING OF SERVO MOTOR

BACKGROUND OF THE INVENTION

1. Field of the Invention

The present invention relates to driving of servo motors, and more particularly, to a feedback switching device and method that allow to actively switch the feedback mode in accordance with the rotating speed of a servo motor.

2. Description of Related Art

Servo motor drivers have been widely applied in modern industries and developed towards high performance, multifunction and low cost. In some application, a servo motor must operate within a wide speed range, and how to build up a speed control architecture is critical to effectively improving the performance and reducing the cost of the servo motor driver.

For example, a designer can use a position sensor such as an encoder or a resolver to build up the speed control architecture for a servo motor. That is, the designer builds up the speed control architecture through a position sensing feedback technology. In such a case, when the servo motor operates at a low rotating speed, the servo motor driver can correctly receive a position signal as long as the bandwidth of the position signal is lower than that of the position sensor. On the other hand, if the servo motor operates at an extra-high rotating speed such that the bandwidth of the position signal is higher than that of the position sensor, the position signal will be distorted. To solve the problem, a sensorless position estimation feedback technology has been developed, which can be applied in a high-speed servo motor to estimate the motor angle, thereby building up the speed control architectures for the high-speed servo motor.

However, before a servo motor operates, the user must determine which one of the position sensing feedback technology and the sensorless position estimation feedback technology is to be used for building up the speed control architecture, and during the operation of the servo motor, the speed control architecture preset by the user cannot be flexibly changed in accordance with the rotating speed of the servo motor. As such, the servo motor driver cannot precisely control the servo motor. In particular, if the position sensing feedback technology is used to build up the speed control architecture, when the rotating speed of the servo motor is higher than a certain value, the position signal obtained through the position sensing feedback technology will be distorted. Therefore, the servo motor driver cannot obtain correct position information. On the other hand, if the sensorless position estimation feedback technology is used to build up the speed control architecture, when the rotating speed of the servo motor is lower than a certain value, the position signal obtained through the sensorless position estimation feedback technology is of low precision. As such, the servo motor driver also cannot obtain correct position information.

Therefore, there is a need to provide a feedback switching device and method for driving of a servo motor so as to overcome the above-described drawbacks.

SUMMARY OF THE INVENTION

Accordingly, the present invention provides a feedback switching device and a method that allow a drive control loop for a servo motor to actively switch the feedback mode in accordance with the rotating speed of the servo motor.

In order to achieve the above and other objectives, the present invention provides a feedback switching device applied to a drive control loop for a servo motor, which comprises: a current sensor for sensing a current supplied to the servo motor and outputting a current feedback signal corresponding to the sensed current; a position sensor for sensing a position of the servo motor and outputting a position sensing signal corresponding to the sensed position; a position estimator for receiving the current feedback signal outputted from the current sensor and outputting a position estimation signal corresponding to the current feedback signal; and a feedback switching comparator for receiving the position sensing signal and the position estimation signal and outputting one of the position sensing signal and the position estimation signal as a position feedback signal according to a preset switching condition.

Further, the present invention provides a feedback switching method applied to a drive control loop for a servo motor, wherein the servo motor initially operates at a low rotating speed. The method comprises the steps of: (1) using a current sensor to sense a current supplied to the servo motor and output a current feedback signal corresponding to the sensed current, using a position sensor to sense a position of the servo motor and output a position sensing signal corresponding to the sensed position, and using a position estimator to receive the current feedback signal and output a position estimation signal corresponding to the current feedback signal; (2) using a speed calculation module to receive the position sensing signal outputted from the position sensor and the position estimation signal outputted from the position estimator and generate a first speed signal and a second speed signal corresponding to the position sensing signal and the position estimation signal, respectively; (3) using a comparison module to receive the first speed signal and the second speed signal and compare the first speed signal with a preset switching condition, to determine whether the first speed signal is higher than the preset switching condition, if yes, the process goes to step (4), otherwise, the process goes to step (6); (4) using a switching module to output the position estimation signal as a position feedback signal; (5) suing the comparison module to compare the second speed signal with the preset switching condition, to determine whether the second speed signal is lower than the preset switching condition, if yes, the process goes to step (6), otherwise, the process goes to step (4); and (6) using the switching module to output the position sensing signal as the position feedback signal.

The invention also provides another feedback switching method applied to a drive control loop for a servo motor, wherein the servo motor initially operates at a high rotating speed. The method comprises the steps of: (1) using a current sensor to sense a current supplied to the servo motor and output a current feedback signal corresponding to the sensed current, using a position sensor to sense a position of the servo motor and output a position sensing signal corresponding to the sensed position, and using a position estimator to receive the current feedback signal and output a position estimation signal corresponding to the current feedback signal; (2) using a speed calculation module to receive the position sensing signal outputted from the position sensor and the position estimation signal outputted from the position estimator and generate a first speed signal and a second speed signal corresponding to the position sensing signal and the position estimation signal, respectively; (3) using a comparison module to receive the first speed signal and the second speed signal and compare the second speed signal with a preset switching condition, to determine whether the second speed signal is lower than the preset switching condition, if yes, the process goes to step (4), otherwise, the process goes to step (6); (4) using a switching module to output the position sensing signal as a position feedback signal; (5) using the comparison module to compare the first speed signal with the preset switching condition, to determine whether the first speed signal is higher than the preset switching condition, if yes, the process goes to step (6), otherwise, the process goes to step (4); and (6) using the switching module to output the position estimation signal as the position feedback signal.

Compared with the prior art, the present invention effectively reduces the cost, and improves the performance and functionality in the servo motor control. The present invention also increases the flexibility of the application of a servo motor driver in a servo driving system having a wide speed range, and improves the overall operation efficiency of the servo motor.

DETAILED DESCRIPTION OF PREFERRED EMBODIMENTS

The following illustrative embodiments are provided to illustrate the disclosure of the present invention, these and other advantages and effects can be apparent to those in the art after reading this specification.

Figure 1:
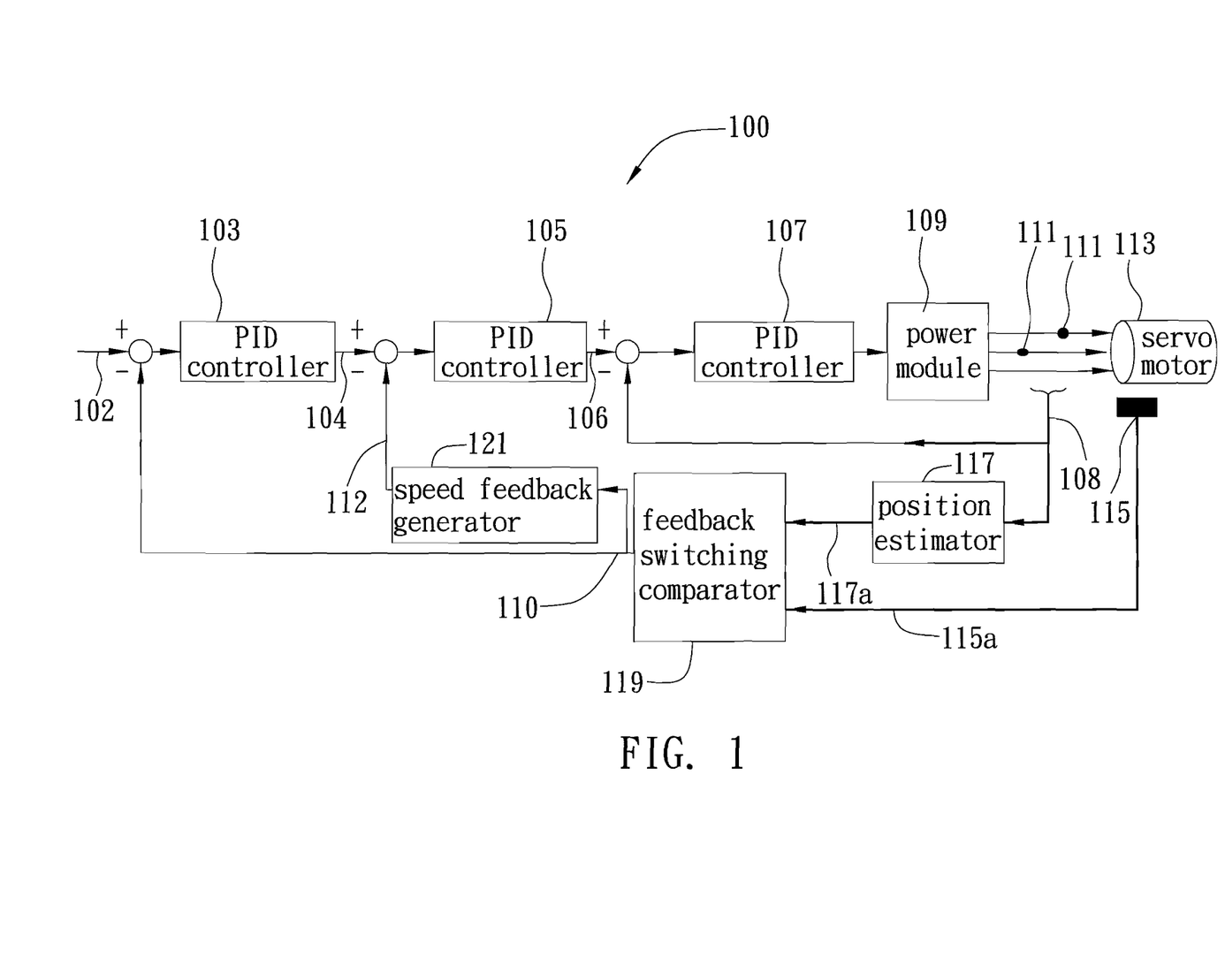
FIG. 1 is a block diagram illustrating the architecture of a feedback switching device for driving of a servo motor according to an embodiment of the present invention.

FIG. 1 is a block diagram showing the architecture of a feedback switching device 100 for driving of a servo motor according to an embodiment of the present invention. In the present embodiment, the feedback switching device 100 is applied to a drive control loop for a servo motor 113. The feedback switching device 100 at least comprises a current sensor 111, a position sensor 115, a position estimator 117 and a feedback switching comparator 119. Further, the feedback switching device 100 can selectively comprise a speed feedback generator 121, such as a differentiator.

The drive control loop can further comprise proportional-integral-derivative controllers (PID controllers) 103, 105, 107 and a power module 109, wherein the PID controller 103 can receive a position command 102, the PID controller 105 can receive a speed command 104, and the PID controller 107 is connected to the power module 109 and can receive a current command 106.

The current sensor 111 is disposed on a power supply path for the servo motor 113 for sensing a current supplied to the servo motor 113 and outputting a current feedback signal 108 corresponding to the sensed current.

The position sensor 115 is disposed on the servo motor 113 for sensing a position of the servo motor 113 and outputting a position sensing signal 115 corresponding to the sensed position. In the present embodiment, the position sensor 115 can be an encoder or a resolve that encodes the position of the servo motor 113.

The position estimator 117 is connected to the current sensor 111 for receiving the current feedback signal 108 and outputting a position estimation signal 117a corresponding to the current feedback signal 108.

The feedback switching comparator 119 is used to receive the position sensing signal 115a, the position estimation signal 117a and a switching condition preset by the user, so as to output one of the position sensing signal 115a and the position estimation signal 117a as a position feedback signal 110 according to the preset switching condition.

Therefore, when the servo motor operates at a low rotating speed, the feedback switching comparator 119 automatically chooses the position sensing signal 115a as the position feedback signal 110, so as to meet the demand for high efficiency. On the other hand, when the servo motor operates at a high rotating speed, the feedback switching comparator 119 automatically chooses the position estimation signal 117a as the position feedback signal 110, so as to meet the demand for wide speed range operation.

Further, the position feedback signal 110 outputted from the feedback switching comparator 119 is combined with the position command 102, so as to be received by the PID controller 103 for generating the speed command 104. The position feedback signal 110 outputted from the feedback switching comparator 119 can be transmitted to the speed feedback generator 121 for generating a speed feedback signal 112. The speed feedback signal 112 is further combined with the speed command 104, so as to be received by the PID controller 105 for generating the current command 106. The current command 106 is further combined with the current feedback signal 108, so as to be received by the PID controller 107, thereby causing the power module 109 connected with the PID controller 107 to perform a relative speed control on the servo motor 113.

In practice, the current sensor 111 disposed on the power supply path for the servo motor 113 senses the current of the servo motor 113 and outputs the current feedback signal 108 corresponding to the sensed current. The position sensor 115 senses the position of the servo motor 113, so as to output the position sensing signal 115a corresponding to the sensed position. The current feedback signal 108 is further transmitted to the position estimator 117 and also transmitted through another path, so as to be combined with the current command 106. When receiving the current feedback signal 108, the position estimator 117 outputs the position estimation signal 117a corresponding to the current feedback signal 108.

Subsequently, the feedback switching comparator 119 receives the position sensing signal 115a and the position estimation signal 117a, so as to output one of the position sensing signal 115a and the position estimation signal 117a as the position feedback signal 110 according to the preset switching condition. The operation of the feedback switching comparator 119 will be detailed later.

Based on the position feedback signal 110, the speed feedback generator 121 generates the speed feedback signal 112, which is further combined with the speed command 104.

Figure 2:
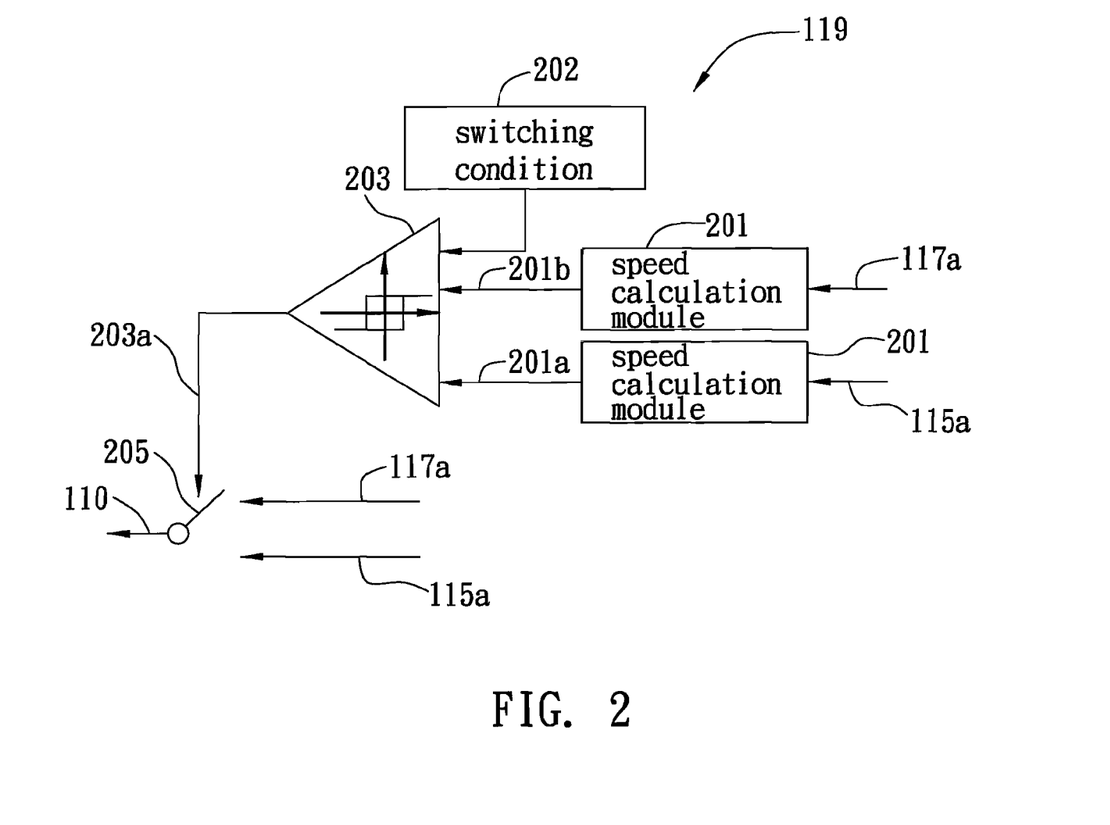
FIG. 2 is a schematic circuit diagram of a feedback switching comparator of FIG. 1.

Referring to FIG. 2 in combination with FIG. 1, FIG. 2 is a schematic circuit diagram of the feedback switching comparator 119. The feedback switching comparator 119 comprises two speed calculation modules 201, a comparison module 203 and a switching module 205.

The speed calculation modules 201 can be differentiators for receiving the position sensing signal 115a outputted from the position sensor 115 and the position estimation signal 117a outputted from the position estimator 117, so as to generate a first speed signal 201a and a second speed signal 201b, respectively. In practice, the two speed calculation modules 201 can be integrated into one module.

The comparison module 203 is used to receive the preset switching condition 202, the first speed signal 201a and the second speed signal 201b, and further compares one of the first speed signal 201a and the second speed signal 201b with the switching condition 202, so as to output a comparison result 203a. It should be noted that in the present embodiment, the comparison module 203 can be controlled through an additional controller, logic circuit or software (not shown). The comparison module 203 can have a hysteresis characteristic within a specified range, such that the comparison module 203 can use the specified range and the switching condition 202 as a comparison standard, thus avoiding oscillation of the comparison result 203a around a threshold value. The switching condition 202 can be set at any point on the characteristic curve of the servo motor 113, as long as the position feedback result is correct.

The switching module 205 is used to receive the position sensing signal 115a outputted from the position sensor 115 and the position estimation signal 117a outputted from the position estimator 117, so as to output one of the position sensing signal 115a and the position estimation signal 117a as the position feedback signal 110.

Figure 3:
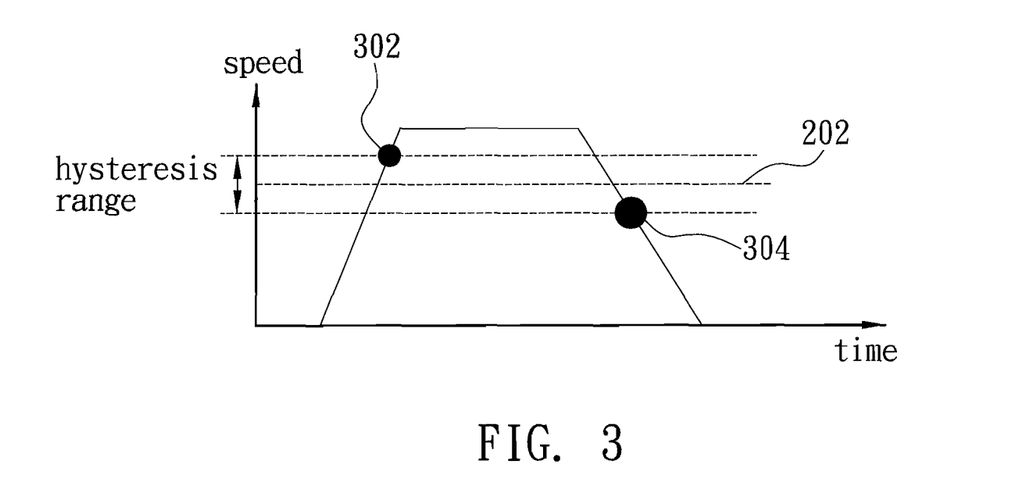
FIG. 3 is a speed-time diagram illustrating the operation of the feedback switching device of the present invention.

Referring to FIG. 3 in combination with FIG. 2, FIG. 3 is a speed-time diagram illustrating the operation of the feedback switching device 100, wherein the hysteresis range is combined with the switching condition 202 for forming a flexible comparison standard.

Before time point 302, the position sensing signal 115a can be set by the user as the position feedback signal 110 for the speed control of the servo motor 113. At this time, the comparison module 203 can also determine that the second speed signal 201b is lower than the preset switching condition 202, i.e., the servo motor 113 operates at a low rotating speed. Therefore, the comparison module 203 outputs the comparison result 203a to the switching module 205, so as to cause the switching module 205 to output the position sensing signal 115a as the position feedback signal 110 for the speed control of the servo motor 113.

At time point 302 (the upper limit of the hysteresis range), the comparison module 203 can determine that the first speed signal 201a is higher than the switching condition 202, i.e., the servo motor 113 operates at a high rotating speed. Therefore, the comparison module 203 outputs the comparison result 203a to the switching module 205, so as to cause the switching module 205 to output the position estimation signal 117a as the position feedback signal 110 for the speed control of the servo motor 113.

At time point 304 (the lower limit of the hysteresis range), the comparison module 203 can determine that the second speed signal 201b is lower than the preset switching condition 202, that is, the servo motor 113 operates at a low rotating speed. Therefore, the comparison module 203 outputs the comparison result 203a to the switching module 205, so as to cause the switching module 205 to output the position sensing signal 115a as the position feedback signal 110 for the speed control of the servo motor 115a.

Figure 4:
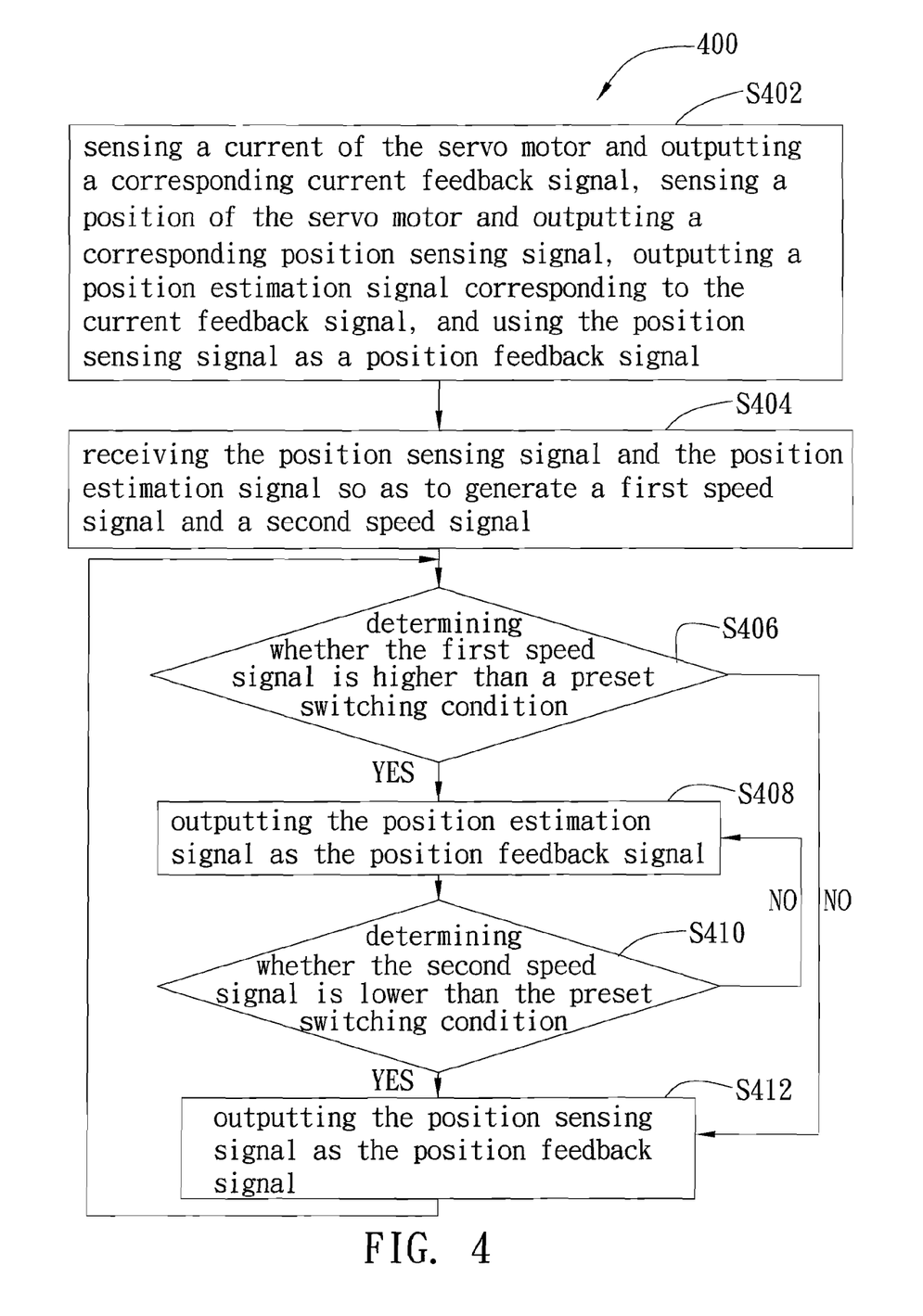
FIG. 4 is a flow diagram illustrating a feedback switching method for driving of a servo motor according to an embodiment of the present invention.

Referring to FIG. 4 in combination with FIGS. 1 and 2, a feedback switching method 400 for driving of a servo motor according to an embodiment of the present invention is shown. The method 400 can be applied to a drive control loop for the servo motor. In the present embodiment, the servo motor initially operates at a low rotating speed.

First, in step S402, a current sensor disposed on the power supply path for the servo motor senses the current supplied to the servo motor and outputs a current feedback signal corresponding to the sensed current; a position sensor senses the position of the servo motor and outputs a position sensing signal corresponding to the sensed position; a position estimator receives the current feedback signal and outputs a position estimation signal corresponding to the current feedback signal; and the position sensing signal is used as the position feedback signal. Then, the process goes to step S404.

In step S404, a speed calculation module receives the position sensing signal outputted from the position sensor and the position estimation signal outputted from the position estimator, so as to generate a first speed signal and a second speed signal corresponding to the position sensing signal and the position estimation signal, respectively. Further, the comparison module receives the preset switching condition, the first speed signal and the second speed signal. Then, the process goes to step S406.

In step S406, the comparison module compares the first speed signal with the preset switching condition, to determine whether the first speed signal is higher than the preset switching condition, if yes, the process goes to step S408, otherwise, the process goes to step S412.

In step S408, the switching module outputs the position estimation signal as the position feedback signal. Then, the process goes to step S410.

In step S410, the comparison module compares the second speed signal with the predetermined switching condition, to determine whether the second speed signal is lower than the preset switching condition, if yes, the process goes to step S412, otherwise, the process goes to step S408.

In step S412, the switching module outputs the position sensing signal as the position feedback signal. Then, the process goes to step S406.

In the feedback switching method 400, the position sensor is an encoder or a resolver that encodes the position of the servo motor. The comparison module can have a hysteresis characteristic within a specified range. Therefore, in step S406 the comparison module can use the hysteresis range and the preset switching condition as the comparison standard for determining whether the first speed signal is higher than the preset switching condition; and in step S410 the comparison module can use the hysteresis range and the preset switching condition as the comparison standard for determining whether the second speed signal is lower than the preset switching condition.

Figure 5:
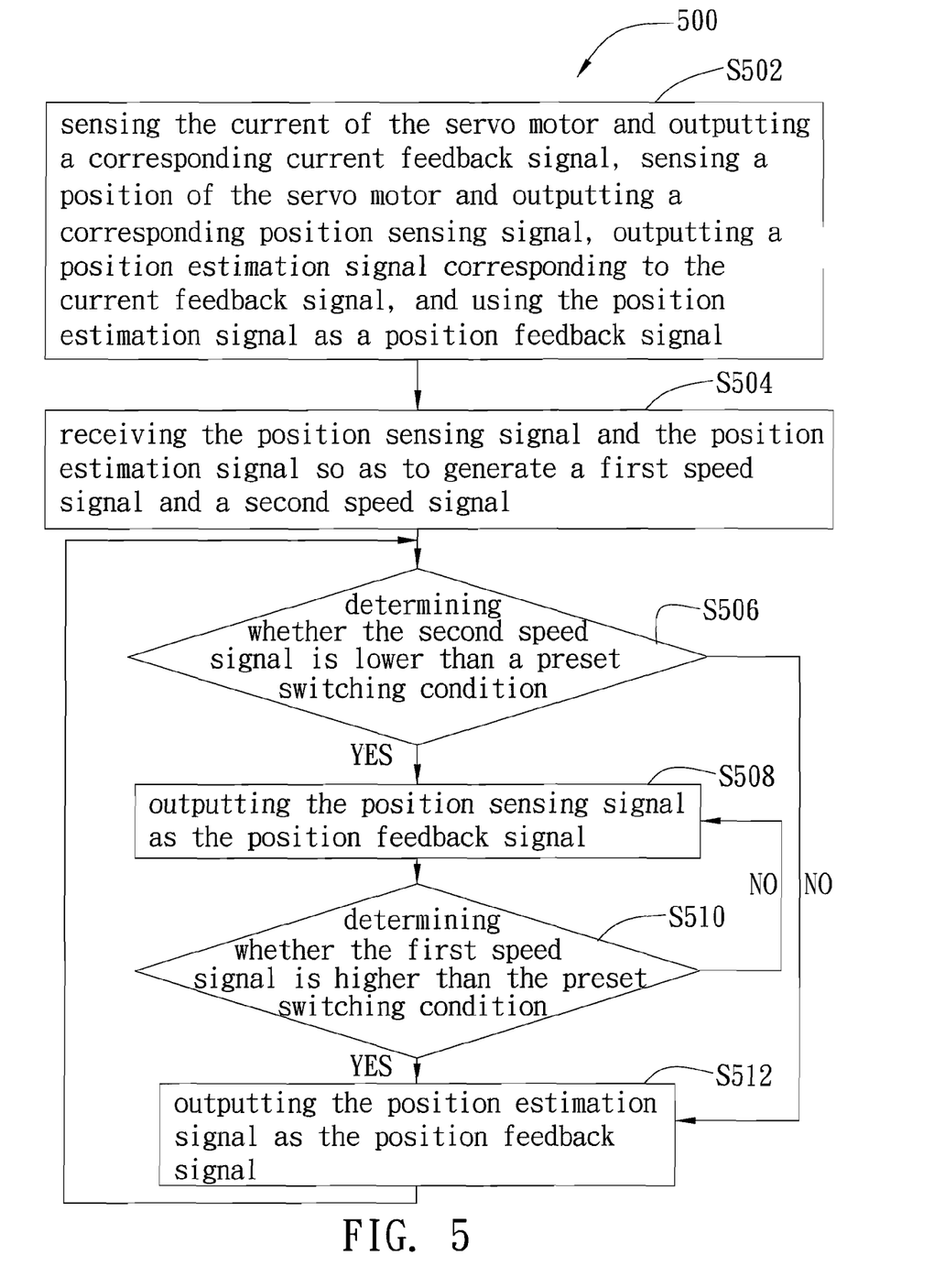
FIG. 5 is a flow diagram illustrating a feedback switching method for driving of a servo motor according to another embodiment of the present invention.

Referring to FIG. 5 in combination with FIGS. 1 and 2, another feedback switching method 500 for driving of a servo motor according to an embodiment of the present invention is shown. The method 500 can be applied to a drive control loop for the servo motor. In the present embodiment, the servo motor initially operates at a high rotating speed.

In step S502, a current sensor disposed on the power supply path for the servo motor senses the current supplied to the servo motor and outputs a current feedback signal corresponding to the sensed current; a position sensor senses the position of the servo motor and outputs a position sensing signal corresponding to the sensed position; a position estimator receives the current feedback signal and outputs a position estimation signal corresponding to the current feedback signal; and the position estimation signal is used as the position feedback signal. Then, the process goes to step S504.

In step S504, a speed calculation module receives the position sensing signal outputted from the position sensor and the position estimation signal outputted from the position estimator, so as to generate a first speed signal and a second speed signal corresponding to the position sensing signal and the position estimation signal, respectively. Further, the comparison module receives the preset switching condition, the first speed signal and the second speed signal. Then, the process goes to step S506.

In step S506, the comparison module compares the second speed signal with the preset switching condition, to determine whether the second speed signal is lower than the preset switching condition, if yes, the process goes to step S508, otherwise, the process goes to step S512.

In step S508, the switching module outputs the position sensing signal as the position feedback signal. Then, the process goes to step S510.

In step S510, the comparison module compares the first speed signal with the predetermined switching condition, to determine whether the first speed signal is higher than the preset switching condition, if yes, the process goes to step S512, otherwise, the process goes to step S508.

In step S512, the switching module outputs the position estimation signal as the position feedback signal. Then, the process goes to step S506.

In the feedback switching method 500, the position sensor is an encoder or a resolver that encodes the position of the servo motor. The comparison module can have a hysteresis characteristic within a specified range. Therefore, in step S506 the comparison module can use the hysteresis range and the preset switching condition as the comparison standard for determining whether the second speed signal is lower than the preset switching condition; and in step S510 the comparison module can use the hysteresis range and the preset switching condition as the comparison standard for determining whether the first speed signal is higher than the preset switching condition.

Therefore, the present invention provides an automatic feedback switching mechanism, so as to improve the functionality of the drive control loop, increase the flexibility of the application of a servo motor driver in a servo driving system having a wide speed range, and improves the overall operation efficiency of the servo motor.

The above-described descriptions of the detailed embodiments are intended to illustrate the preferred implementation according to the present invention but are not intended to limit the scope of the present invention. Accordingly, all modifications and variations completed by those with ordinary skill in the art should fall within the scope of present invention defined by the appended claims.

What is claimed is:

1. A feedback switching device applied to a drive control loop for a servo motor, comprising:
a current sensor for sensing a current supplied to the servo motor and outputting a current feedback signal corresponding to the sensed current;
a position sensor for sensing a position of the servo motor and outputting a position sensing signal corresponding to the sensed position;
a position estimator for receiving the current feedback signal and outputting a position estimation signal corresponding to the current feedback signal; and
a feedback switching comparator for receiving the position sensing signal and the position estimation signal and outputting one of the position sensing signal and the position estimation signal as a position feedback signal according to a preset switching condition;
wherein the feedback switching comparator comprises:
a speed calculation module for receiving the position sensing signal outputted from the position sensor and the position estimation signal outputted from the position estimator and generating a first speed signal and a second speed signal corresponding to the position sensing signal and the position estimation signal, respectively;
as comparison module for receiving the first speed signal and the second speed signal and comparing one of the first and second speed signals with the preset switching condition so as to output a comparison result; and
a switching module for receiving the position sensing signal outputted from the position sensor and the position estimation signal outputted from the position estimator and outputting one of the position sensing signal and the position estimation signal as the position feedback signal according to the comparison result.

2. The device of claim 1, wherein the position sensor is an encoder or a resolver that encodes the position of the servo motor.

3. The device of claim 1, wherein the comparison module has a hysteresis characteristic within a specified range and the comparison module uses the specified range and the preset switching condition as a comparison standard.

4. The device of claim 1, further comprising a speed feedback generator for receiving the position feedback signal, and outputting a speed feedback signal corresponding to the position feedback signal, the drive control loop receiving a position command, a speed command and a current command for controlling a rotating speed of the servo motor.

5. The device of claim 4, wherein the position command is combined with the position feedback signal outputted from the feedback switching comparator.

6. The device of claim 4, wherein the speed command is combined with the speed feedback signal outputted from the speed feedback generator.

7. The device of claim 4, Wherein the current command is combined with the current feedback signal outputted from the current sensor.

8. A feedback switching method applied to a drive control loop for a servo motor, wherein the servo motor initially operates at a low rotating speed, the method comprising the steps of:
(1) using a current sensor to sense a current supplied to the servo motor and outputting a current feedback signal corresponding to the sensed current, using a position sensor to sense a position of the servo motor and outputting a position sensing signal corresponding to the sensed position, and using a position estimator to receive the current feedback signal and output a position estimation signal corresponding to the current feedback signal;
(2) using a speed calculation module to receive the position sensing signal outputted from the position sensor and the position estimation signal outputted from the position estimator and to generate a first speed signal and a second speed signal corresponding to the position sensing signal and the position estimation signal, respectively, and using a comparison module to receive the first and second speed signals;
(3) using the comparison module to compare the first speed signal with a preset switching condition, to determine whether the first speed signal is higher than the preset switching condition, if yes, the process goes to step (4), otherwise, the process goes to step (6);
(4) using a switching module to output the position estimation signal as a position feedback signal;
(5) using the comparison module to compare the second speed signal with the preset switching condition, to determine whether the second speed signal is lower than the preset switching condition, if yes, the process goes to step (6), otherwise, the process goes to step (4); and (6) using the switching module to output the position sensing signal as the position feedback signal.

9. The method of claim 8, wherein the position sensor is an encoder or a resolver that encodes the position of the servo motor.

10. The method of claim 8, Wherein the comparison module has a hysteresis characteristic, within a specified range, and the comparison module uses the specified range and the preset switching condition as a comparison standard for determining whether the first speed signal is higher than the preset switching condition in step (3) and determining whether the second speed signal is lower than the preset switching condition in step (5).

11. A feedback switching method applied to a drive control loop for a servo motor, wherein the servo motor initially operates at a high rotating speed, the method comprising the steps of:
(1) using a current sensor to sense a current supplied to the servo motor and outputting a current feedback signal corresponding to the sensed current, using a position sensor to sense a position of the servo motor and outputting a position sensing signal corresponding to the sensed position, and using a position estimator to receive the current feedback signal and output a position estimation signal corresponding to the current feedback signal;
(2) using a speed calculation module to receive the position sensing signal outputted from the position sensor and the position estimation signal outputted from the position estimator and to generate a first speed signal and a second speed signal corresponding to the position sensing signal and the position estimation signal, respectively, and using a comparison module to receive the first and second speed signals;
(3) using the comparison module to compare the second speed signal with a preset switching condition, to determine whether the second speed signal is lower than the preset switching condition, if yes, the process goes to step (4), otherwise, the process goes to step (6);
(4) using a switching module to output the position sensing signal as a position feedback signal;
(5) using the comparison module to compare the first speed signal with the preset switching condition, to determine whether the first speed signal is higher than the preset switching condition, if yes, the process goes to step (6), otherwise, the process goes to step (4); and
(6) using the switching module to output the position estimation signal as the position feedback signal.

12. The method of claim 11, wherein the position sensor is an encoder or a resolver that encodes the position of the servo motor.

13. The method of claim 11, wherein the comparison module has a hysteresis characteristic within a specified range, and the comparison module uses the specified range and the preset switching condition as a comparison standard for determining whether the second speed signal is lower than the preset switching condition in step (3) and determining whether the first speed signal is higher than the preset switching condition in step (5).

* * * * *